United States Patent
Armangau et al.

(10) Patent No.: US 9,805,044 B1
(45) Date of Patent: Oct. 31, 2017

(54) WINDOW-BASED RESOURCE ALLOCATION IN DATA STORAGE SYSTEMS

(71) Applicant: EMC Corporation, Hopkinton, MA (US)

(72) Inventors: Philippe Armangau, Acton, MA (US); Michael Scheer, Summit, NJ (US); Ahsan Rashid, Edison, NJ (US); Rohit K. Chawla, Scotch Plains, NJ (US); Feng Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 58 days.

(21) Appl. No.: 14/674,389

(22) Filed: Mar. 31, 2015

(51) Int. Cl.
*G06F 3/06* (2006.01)
*G06F 17/30* (2006.01)

(52) U.S. Cl.
CPC ........ *G06F 17/30138* (2013.01); *G06F 3/064* (2013.01); *G06F 3/067* (2013.01); *G06F 3/0613* (2013.01)

(58) Field of Classification Search
CPC ..................................................... G06F 3/0631
See application file for complete search history.

(56) References Cited

U.S. PATENT DOCUMENTS

| | | | |
|---|---|---|---|
| 7,284,104 B1* | 10/2007 | Wu ..................... | G06F 11/1451 707/999.202 |
| 7,647,466 B1 | 1/2010 | Rao et al. | |
| 8,037,013 B2 | 10/2011 | Rao | |
| 8,862,639 B1 | 10/2014 | Rao | |
| 9,128,949 B2 | 9/2015 | Lipcon | |
| 2003/0172226 A1* | 9/2003 | Jolly ....................... | G06F 3/061 711/111 |
| 2007/0260830 A1* | 11/2007 | Faibish ................... | G06F 3/061 711/162 |
| 2009/0077327 A1* | 3/2009 | Hara ..................... | G06F 3/0608 711/154 |
| 2010/0106734 A1* | 4/2010 | Calder .............. | G06F 17/30011 707/758 |
| 2016/0188211 A1* | 6/2016 | Song ..................... | G06F 3/0604 711/114 |

OTHER PUBLICATIONS

Nakamura et al. "Pre-allocation Size Adjusting Methods Depending on Growing File Size." Sep. 2008. IEEE. SNAPI 2008. pp. 19-25.*
Mingming Cao. "Reservation based ext3 preallocation." Mar. 2004. https://lwn.net/Articles/78098/.*

(Continued)

*Primary Examiner* — Nathan Sadler
(74) *Attorney, Agent, or Firm* — BainwoodHuang

(57) ABSTRACT

A technique for managing block allocation in data storage systems involve providing multiple ranges of contiguous logical addresses (logical windows) in a logical address space of a file and allocating contiguous ranges of physical addresses (physical windows) in a file system to respective logical windows in response to requests to write data to logical addresses within the logical windows. When allocating blocks from one or more streams, each logical window to which writes are directed is mapped to a respective physical window, and each logical address in the logical window is mapped to a physical address in the physical window.

20 Claims, 7 Drawing Sheets

(56) References Cited

OTHER PUBLICATIONS

McKusick et al. The Design and Implementation of the 4.4BSD Operating System. 1996. Addison-Wesley. pp. 265-284.*
Cao et al. "State of the Art: Where we are with the Ext3 filesystem." 2005. http://www3.cs.stonybrook.edu/~prade/Teaching/S16-CSE506/prez/ext3.pdf.*
IEEE. IEEE 100: The Authoritative Dictionary of IEEE Standards Terms. Dec. 2000. IEEE. $7^{th}$ ed. pp. 107.*
Microsoft. Microsoft Computer Dictionary. 2002. Microsoft. $5^{th}$ ed. pp. 80.*

\* cited by examiner

WINDOW-BASED RESOURCE ALLOCATION IN DATA STORAGE SYSTEMS

BACKGROUND

Data storage systems are arrangements of hardware and software that include storage processors coupled to arrays of non-volatile storage devices. In typical operation, storage processors service storage requests that arrive from client machines. The storage requests specify data objects (e.g., file systems, LUNs, vVols, and the like) to be accessed, overwritten, created, or deleted, for example. The storage processors run software that manages incoming storage requests and performs various data processing tasks to organize and secure the data stored on the non-volatile storage devices.

In a file system, data may be written to a file. For example, a storage processor writes data from an application specifying a range of logical addresses within a file. Conventional approaches to allocating storage space to accommodate new data involves identifying a free block in the file system and allocating sequential physical addresses from the free block forward. Allocating sequential physical addresses of the file system to store data for sequential logical addresses of the file helps to reduce fragmentation.

SUMMARY

Unfortunately, there are deficiencies with the above-described conventional approach to allocating storage space. For example, writes to disk effected by multiple, concurrent streams can result in considerable disk fragmentation. Such concurrent streams may each handle a respective range of logical addresses of a file but concurrently write to sequential physical addresses. Although sequential writes to physical addresses reduce fragmentation when writing from a single stream, when writing from multiple streams the effect is to interleave writes for different logical address ranges in sequential physical addresses, which results in a high degree of fragmentation.

In contrast with the above-described conventional approach to allocating storage space, improved techniques of managing block allocation in data storage systems involve providing multiple ranges of contiguous logical addresses (logical windows) in a logical address space of a file and allocating contiguous ranges of physical addresses (physical windows) in a file system to respective logical windows in response to requests to write data to logical addresses within the logical windows. When allocating blocks from one or more streams, each logical window to which writes are directed is mapped to a respective physical window, and each logical address in the logical window is mapped to a physical address in the physical window.

Advantageously, the improved techniques reduce disk fragmentation in the presence of multiple streams by ensuring that each range of logical addresses of a file is mapped to a respective range of physical addresses.

One embodiment of the improved techniques is directed to a method of managing block allocation in data storage systems. The method includes providing multiple logical windows in a logical address space of a file stored in a file system, each logical window being a contiguous range of logical addresses. The method also includes receiving a first write request containing data to be written to the file at a first logical address, the first logical address being within a first logical window in the logical address space of the file. The method further includes, in response to the first write request, allocating a first physical window to the first logical window for exclusive use by the first logical window, the first physical window being a first range of contiguous blocks in a physical address space of the file system. The method further includes receiving a second write request containing data to be written to the file at a second logical address, the second logical address being within a second logical window in the logical address space of the file. The method further includes, in response to the second write request, allocating a second physical window to the second logical window for exclusive use by the second logical window, the second physical window being a second range of contiguous blocks in the physical address space of the file system.

Additionally, some embodiments are directed to a data storage system. The data storage system includes memory and controlling circuitry coupled to the memory. The controlling circuitry of the source is constructed and arranged to carry out a method of managing block allocation in data storage systems.

Further, some embodiments are directed to a computer program product having a non-transitory, computer-readable storage medium which stores executable code, which when executed by a data storage system, causes the data storage system to perform a method of managing block allocation in data storage systems.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of managing block allocation in data storage systems involve providing multiple logical windows in a logical address space of a file and allocating blocks in a physical window in a file system to a logical window in response to a request to write data at a logical address in the logical window.

Figure 1:
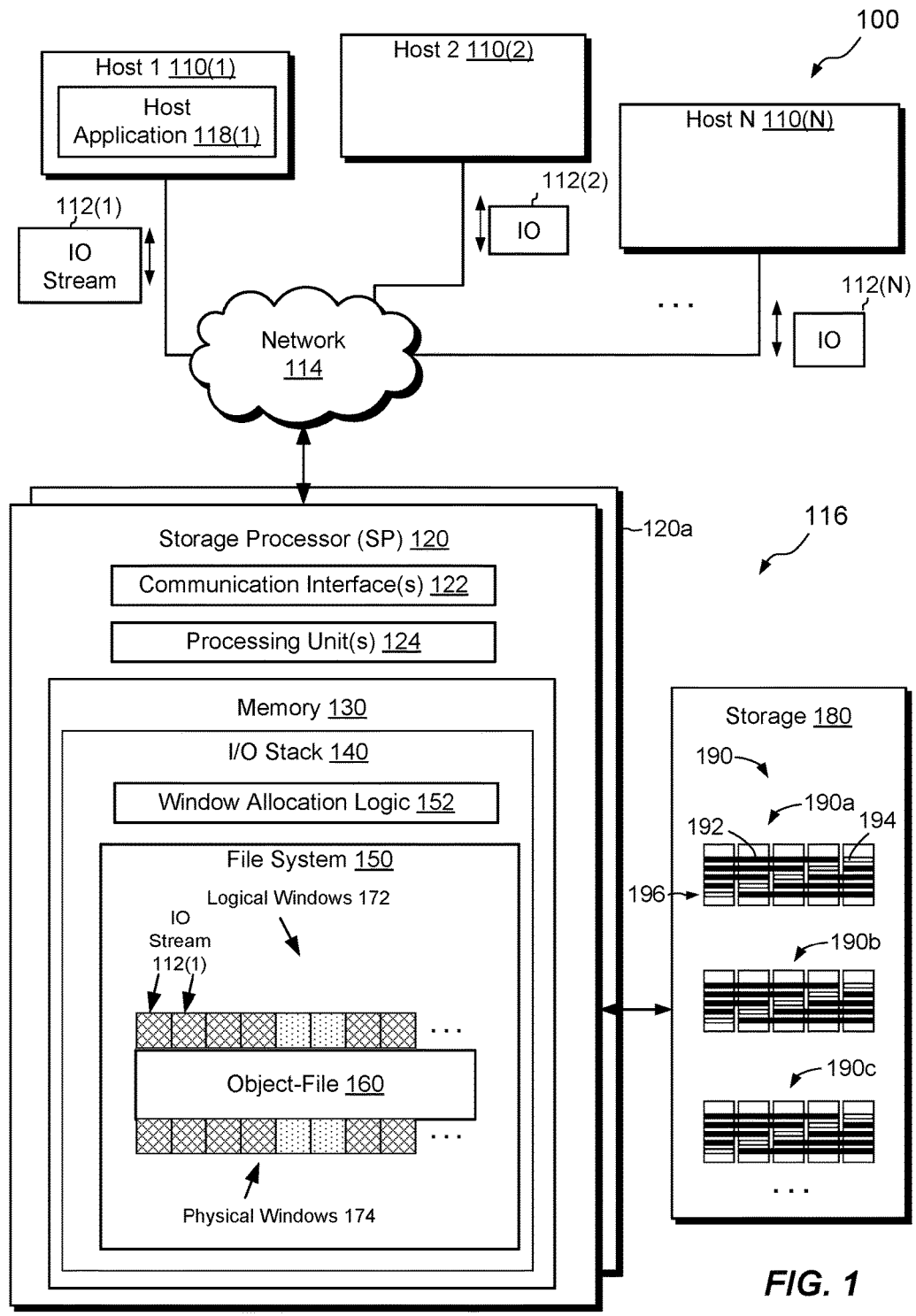
FIG. 1 is a block diagram illustrating an example electronic environment in which the improved technique can be carried out.

FIG. 1 shows an example environment 100 in which embodiments of the improved technique hereof can be practiced. Here, multiple host computing devices ("hosts"), shown as devices 110(1) through 110(N), run respective host applications 118(1-N) which cause hosts 110(1-N) to access a data storage system 116 over a network 114. The data storage system 116 includes a storage processor, or "SP,"

120 and storage 180. The data storage system 116 may include multiple SPs like the SP 120 (e.g., a second SP, 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IO streams 112(1-N) from respective applications 118(1-N).

In an example, the storage 180 is organized in RAID groups 190a, 190b, and 190c (collectively, 190), where each RAID group is composed of multiple disk drives. The disk drives may include magnetic disk drives, electronic flash drives, optical drives, and/or other types of drives. In a typical example, each of the RAID groups 190 includes disk drives of a common type that provide similar performance. Each of the RAID groups 190 is seen to include five disk drives. Five stripes are shown in each RAID group, although it should be understood that each RAID group may include hundreds or thousands or more stripes. Each stripe 196 is shown as a horizontal band across all of the disk drives in a RAID group and includes four data segments 192 and a single parity segment 194. Segments may be of any suitable size, such as 64 KB, for example, such that each stripe has a length of 256 KB (parity is generally not counted when measuring stripe length). Other RAID configurations may be used, including those with a different number of disk drives per RAID group, different numbers and/or sizes of data and/or parity segments, and/or different numbers of stripes. Any number of RAID groups may be provided, including a single RAID group. The example shown is thus intended to be merely illustrative.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests according to both block-based and file-based protocols and to respond to such IO requests by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

The memory 130 is seen to include (i.e., realize by operation of programming code) an IO stack 140. The IO stack 140 provides an execution path for host IOs (e.g., IO stream 112).

The IO stack 140 is seen to include a file system 150 and window allocation logic 152. The file system 150 realizes a data object in the form of an object-file 160. The data object may itself take the form of a LUN (Logical Unit Number), a host file system, a VVol (virtual volume, available from VMware, Inc. of Palo Alto, Calif.), or some other data object, for example. Mapping within the IO stack 140 converts IO requests to corresponding reads and writes of the underlying object-file 160. The object-file 160 has a logical address space presented here in the form of a set of logical windows 172, each logical window being a contiguous range of logical addresses in the logical address space. In an example, the logical address space is a monotonic range of logical offsets into the object-file 160, e.g., as tracked by an inode structure of the object-file 160 in the file system 150.

The IO requests specify not only data to be written but also the locations of the data to be written relative to the data object. For example, if the data object is a LUN, an IO request may specify the location of the data as an offset into the LUN. If the data object is a host file system, the IO request may specify the location of the data by file name and an offset into the named file. As will be described, the IO stack 140 maps these various location indicators to a set of logical offsets within the object-file 160. The file system 150 further maps these logical offsets to physical addresses (among the addresses 174) of blocks at specified FSBNs. In some cases, the data to be written are directed to blocks that have already been allocated and mapped by the file system 150, such that the data writes prescribe overwrites of existing blocks. In other cases, the data to be written do not yet have any associated physical storage, such that the file system must allocate new blocks to the object-file 160 to store the data.

Window allocation logic 152 causes SP 120 to allocate physical windows 174 (i.e., ranges of contiguous blocks in a physical address space of the file system 150 that the file system 150 uses to store data of the object-file 160) to respective logical windows 172. These "windows" are not inherent features of the file system 150 but rather are logical constructs provided herein as embodiments of the invention. The object file 160 has a logical address space, and the window allocation logic 152 provides logical windows within the logical address space to facilitate block allocation. In an example, the window allocation logic 152 divides the logical address space of the object-file 160 into uniformly-sized logical windows, where each logical window covers a respective, contiguous logical address range of the object-file 160. The window allocation logic 152 may similarly provide physical windows in the physical address space of the file system 150. For instance, the window allocation logic 152 divides a data subspace of the physical address space into uniformly-sized physical windows. These windows are also logical constructs and may be made to be the same size as the logical windows. In an example, the physical addresses of the physical address space are identified by file system block number (FSBN).

In an example operation, the hosts 110(1-N), in the course of running respective host applications 118(1-N), issue IO streams 112(1-N) to the data storage system 116. Each of the IO streams 112(1-N) may include any number of IO requests and may specify a respective range of logical addresses to be written to in the object-file 160.

Once the SP 120 receives the IO streams 112(1-N), the window allocation logic 150 identifies the logical windows into which each IO stream 112 is writing given the logical address ranges specified. As shown in FIG. 1, data from IO stream 112(1) is directed to logical addresses in the object-file 160 that fall within two logical windows, while data from IO stream 112(2) is directed to logical addresses in the object-file 160 that fall within another logical window.

If the SP 120 determines that a logical window is empty prior to being written to, then window allocation logic 152 reserves a new physical window for the logical window for exclusive use by the logical window. The physical window reserved may be a next available window or may be located at any location in the physical address space of the file system 150. It should be understood that window allocation logic 152 reserves every block of the physical window regardless of how many physical blocks are allocated within the physical window. Thus, a physical window is considered to be "allocated" when any of the blocks within the physical window are allocated, even a single block. Conversely, a physical window is considered to be "free" only all of the physical blocks within the window are free.

However, if SP 120 finds that a physical window has already been reserved for the logical window to which data are directed, then window allocation logic 150 allocates a new block in the already-reserved physical window. Thus, for example, there is a one-to-one mapping between each logical address in a logical window and a physical block (FSBN) in the physical window reserved for that logical window. This one-to-one mapping allows the window allocation logic 152 to allocate blocks for known address offsets into a logical window at the same offsets into the physical window. Thus, addresses that are contiguous within a logical window are laid out contiguously in the corresponding physical window. There is no requirement, however, that contiguous logical windows be mapped to contiguous physical windows. Thus, the contiguous layout is preserved within physical windows but not necessarily between or among them.

Figure 2:
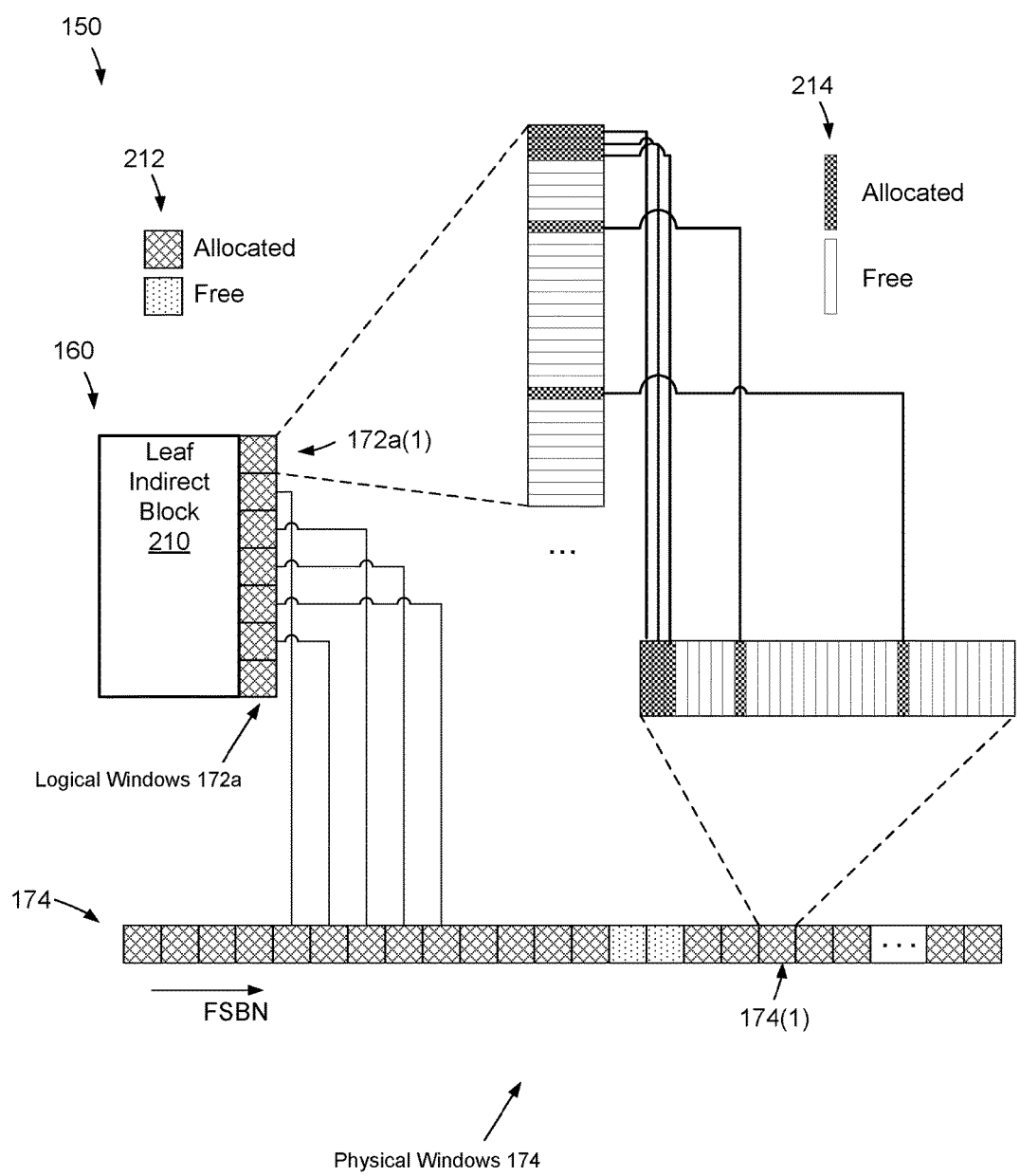
FIG. 2 is a block diagram illustrating an example window allocation in the electronic environment of FIG. 1.

FIG. 2 illustrates an example arrangement of the file system 150. Here, a data subspace of the physical address space includes multiple physical windows 174. In an example, the windows 174 are uniformly sized and cover unique ranges of increasing FSBN, with no window overlapping with any other window. The data subspace can thus be regarded as being divided into windows 174, with the windows 174 provided at predetermined intervals. Although not required, each of the windows 174 may have a window number (not shown), which indicates an ordinal position of the window within the physical address space of the file system 150. The windows 174 in this example are uniformly sized, and the size of the windows may be selected to match a size of a full stripe of a RAID group in underlying storage 180. This is merely an example, though, as windows 174 may be provided in different sizes, e.g., to correspond to different integer multiples of a full stripe and/or to different stripe sizes. For instance, the file system 150 may be supported by multiple RAID groups having different sized stripes, and windows 174 backed by different RAID groups may be of different size. Further, although the windows 174 in this example are adjacent to one another, this is also merely an example, as windows 174 may be arranged within the physical address space in any suitable way.

In some arrangements, a window size may be specified by user preference. Along these lines, the SP 120 may receive a command from an administrator to set the size of a physical window 174. As a special case, the administrator may choose the size to be an integer multiple of a full stripe.

As indicated with reference to legend 212, each of the windows 174 is either allocated or free. A window is allocated if any of the blocks within its range of FSBNs are allocated. A window is free only if none of the blocks within its range of FSBNs are allocated.

The expanded view reveals that each of the physical windows 174 contains 32 blocks. Other implementations may provide other numbers of blocks per window. As indicated with reference to legend 214, window 174(1) has five allocated blocks. These allocated blocks may belong to the object-file 160 or to some other file(s) or structure(s) in the file system 150. The rest of the blocks in window 174(1) are free.

It should be understood that blocks within the window 174(1) are sparsely allocated. Sparse allocation of blocks within window 174(1) may be a common occurrence in file systems using certain allocation schemes and may contribute to the file system 150 running short on free windows.

FIG. 2 further illustrates the logical address space of the object-file 160. Object-file 160 includes a leaf indirect block 210 that contains block pointers to data blocks of the file system 150. As illustrated in FIG. 2, the block pointers are contained within the logical windows 172a into which the logical address space of the object-file 160 is divided.

As shown, some of the logical windows 172a are mapped to respective physical windows 174 within the physical address space of the file system 150. Each of the logical windows 172a mapped to a physical window has at least one block pointer mapped to an allocated physical block within a physical window.

In the example shown in FIG. 2, some of the lines representing the mappings between the logical windows 172a in the leaf indirect block 210 and the physical windows 174 are seen cross, and such crossed lines indicate that the mappings are not necessarily adjacent. In an example, this non-adjacency of physical windows 174 reserved for adjacent logical windows 172a results from the receipt of concurrent IO streams 112(1-N). Each stream 112 (FIG. 1) may be directed to a respective range of logical addresses of the object-file 160, but the window allocation logic 150 may reserve windows in the order of writes received. Thus, writes directed to non-contiguous address ranges from different streams may be allocated to contiguous physical windows 174 if the write requests arrive adjacently in time.

FIG. 2 also illustrates an expanded view of one particular logical block 172a(1) to which the physical block 174(1) is allocated. Here, the logical window 172a(1) has the same number of addresses in logical address space as the physical window 174(1) has in physical address space. Further, this example illustrates the fact discussed above that the mapping from a single logical window 172a(1) to a physical window 174(1) preserves the offsets within each window. That is, the first three occupied addresses in logical block 172a(1) map respectively to the first three occupied blocks in physical window 174(1). In this way, once a single physical address to which a logical address within a logical window maps is known, then the SP 120 may easily determine where to write data from subsequent IO streams specifying logical addresses in that logical window.

Figure 3:
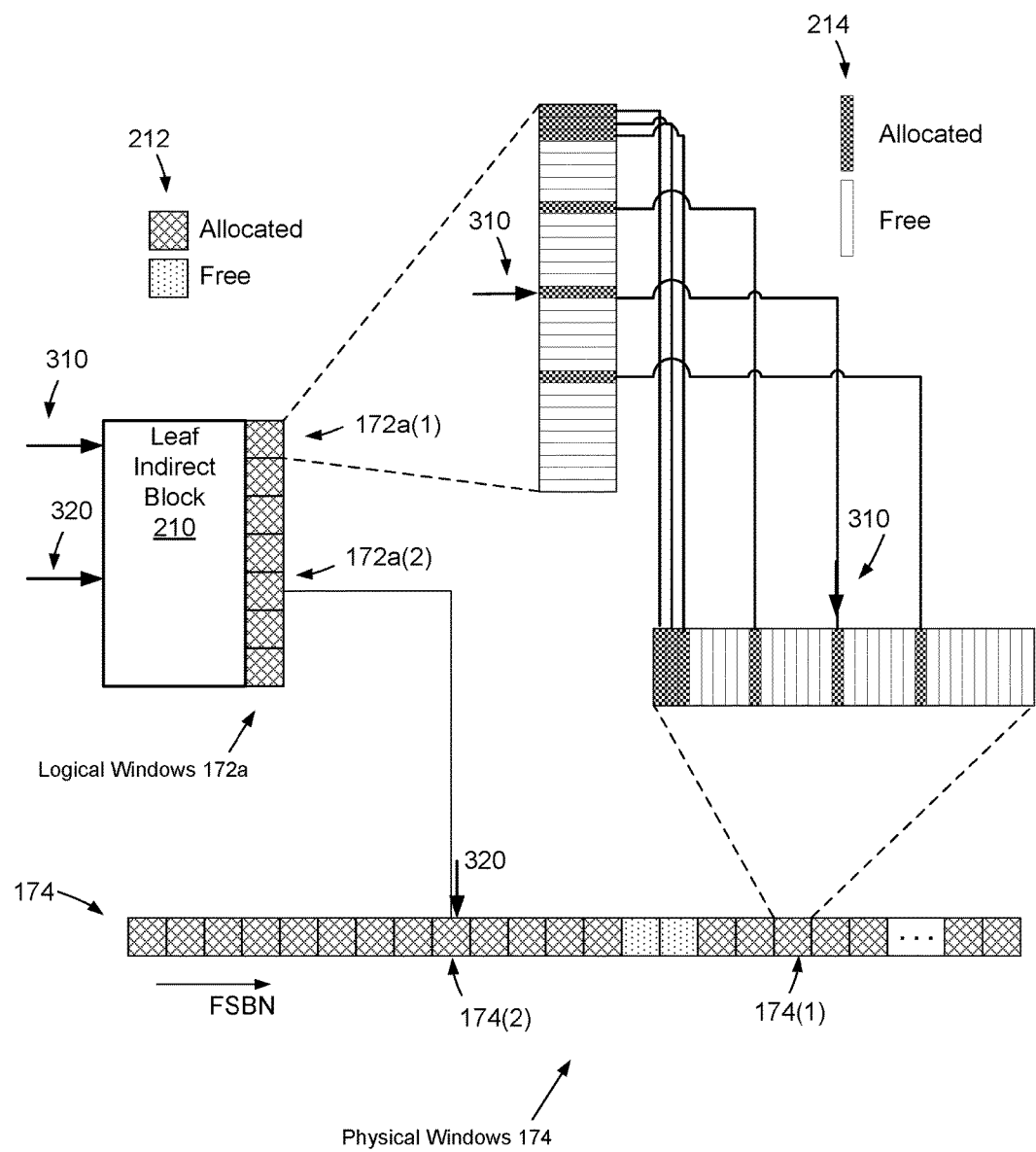
FIG. 3 is a block diagram illustrating another example window allocation in the electronic environment of FIG. 1.

FIG. 3 illustrates this process of writing of data into a block in a pre-allocated physical window. Data represented by arrows 310 and 320 ("data 310" and "data 320") are respectively written at addresses in logical space within windows 172a(1) and 172a(2), respectively. Logical windows 172a(1) and 172a(2) are mapped to physical windows 174(1) and 174(2), respectively.

Referring to the exploded view 220 of logical window 172a(1), the SP 120 writes data 310 to a logical address specified in an IO stream that carried the data, e.g., IO stream 112(1) (FIG. 1). The logical address is now marked as allocated according to legend 214.

To determine whether there is a physical window reserved for the logical window 172a(1), the SP searches for a logical address within the window 172a(1) which points to a physical address in physical address space. In this case, the SP may find such block pointers by searching at the beginning of the window 172a(1) and traversing in order through the window 172a(1).

Once the SP 120 finds a block pointer at a logical address within the window 172a(1), the SP concludes that a window 172a(1) has already been assigned a physical window and proceeds to place the new data at the same relative position within the physical window as the logical address is within the logical window.

The result of this mapping is shown in FIG. 3 through the exploded view of the physical window 174(1). The SP 120 writes the data 310 to the block at an address offset from the block to which the beginning of the logical window 172a(1) maps. Thus, there is a simple procedure for placing blocks in physical address space that reduces fragmentation in the storage device 180.

Nevertheless, it should be understood that there might be situations in which the above-described simple mappings may not apply. In such situations, it may be advantageous for the SP 120 to apply alternative mappings from logical addresses to physical blocks.

Figure 4:
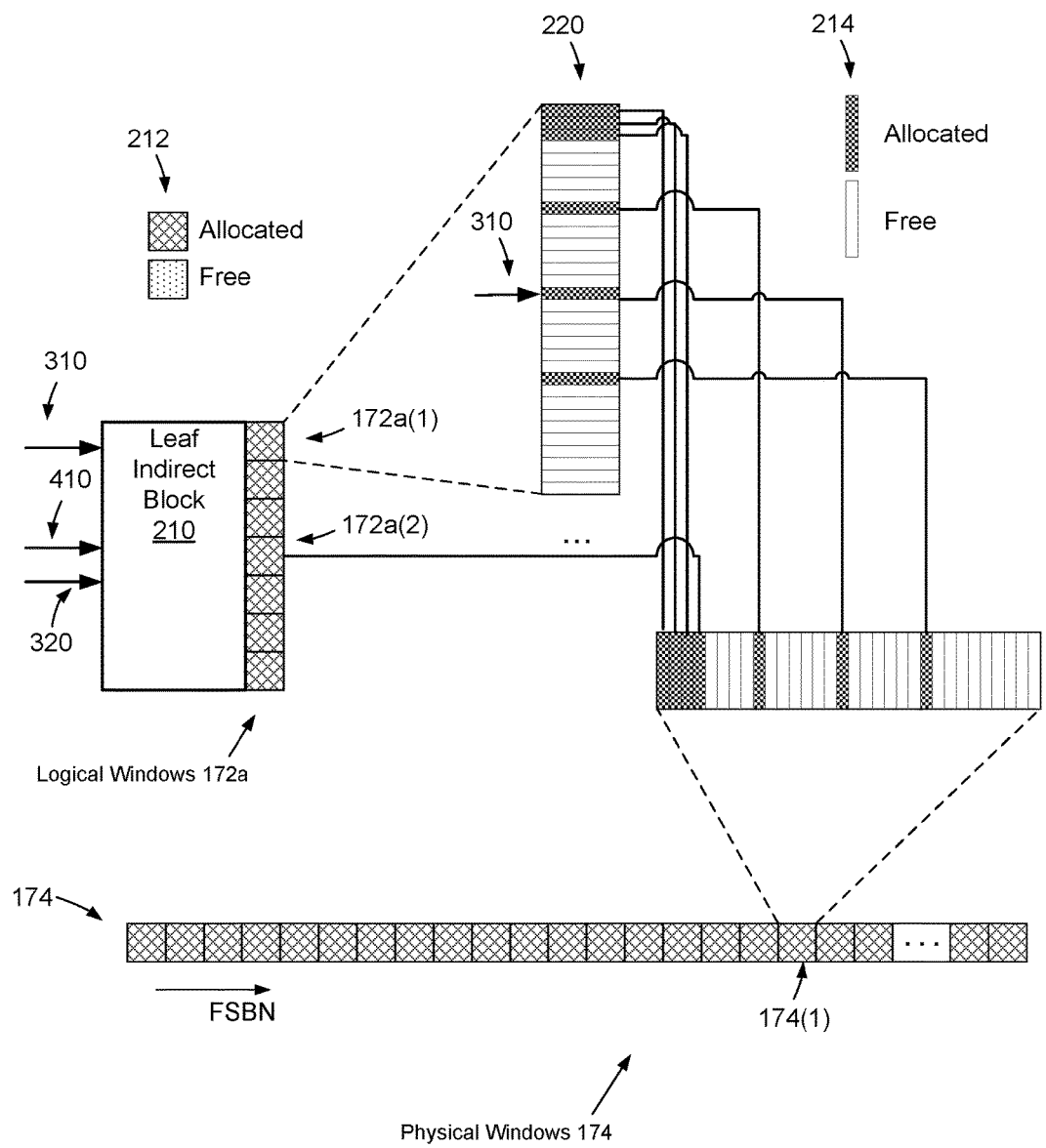
FIG. 4 is a block diagram illustrating an example block allocation in the electronic environment of FIG. 1.

FIG. 4 illustrates such a situation. As shown in FIG. 4, each of the physical windows 174 in physical address space has been allocated. Thus, no new windows are available to meet allocation requests for new ranges of data. In some arrangements, many or all of the physical windows are sparsely populated, with window-based allocation tying up a large amount of free storage space.

To avoid such a scenario, the window allocation logic 152 (or the SP 120) may revert back to a conventional, sequential block allocation procedure when all of the physical windows 174 in physical address space have been allocated. Specifically, upon receiving data 410 to be stored in a new logical window of the object-file 160, the SP verifies that there are no available physical windows in which to place the newly arriving data.

Upon verifying that there are no physical windows 174, the window allocation logic 152 (FIG. 1) begins searching sequentially through the physical addresses until a free block is located.

FIG. 4 also shows the result of such a procedure. Here, the window allocation logic 152 or the SP 120 writes the data 410 to the first available block within physical window 174(1), which is the fourth block from the beginning of the logical window 172a(1).

It should be understood that, once the window allocation logic 152 reverts to the block-by-block allocation described above, then the policy of reserving windows has been suspended. In order to reinstate window-based allocation, the SP 120 might rearrange the data stored in the blocks according to logical addresses so as to reinstate mappings from logical windows 172a to physical windows 174.

Figure 5:
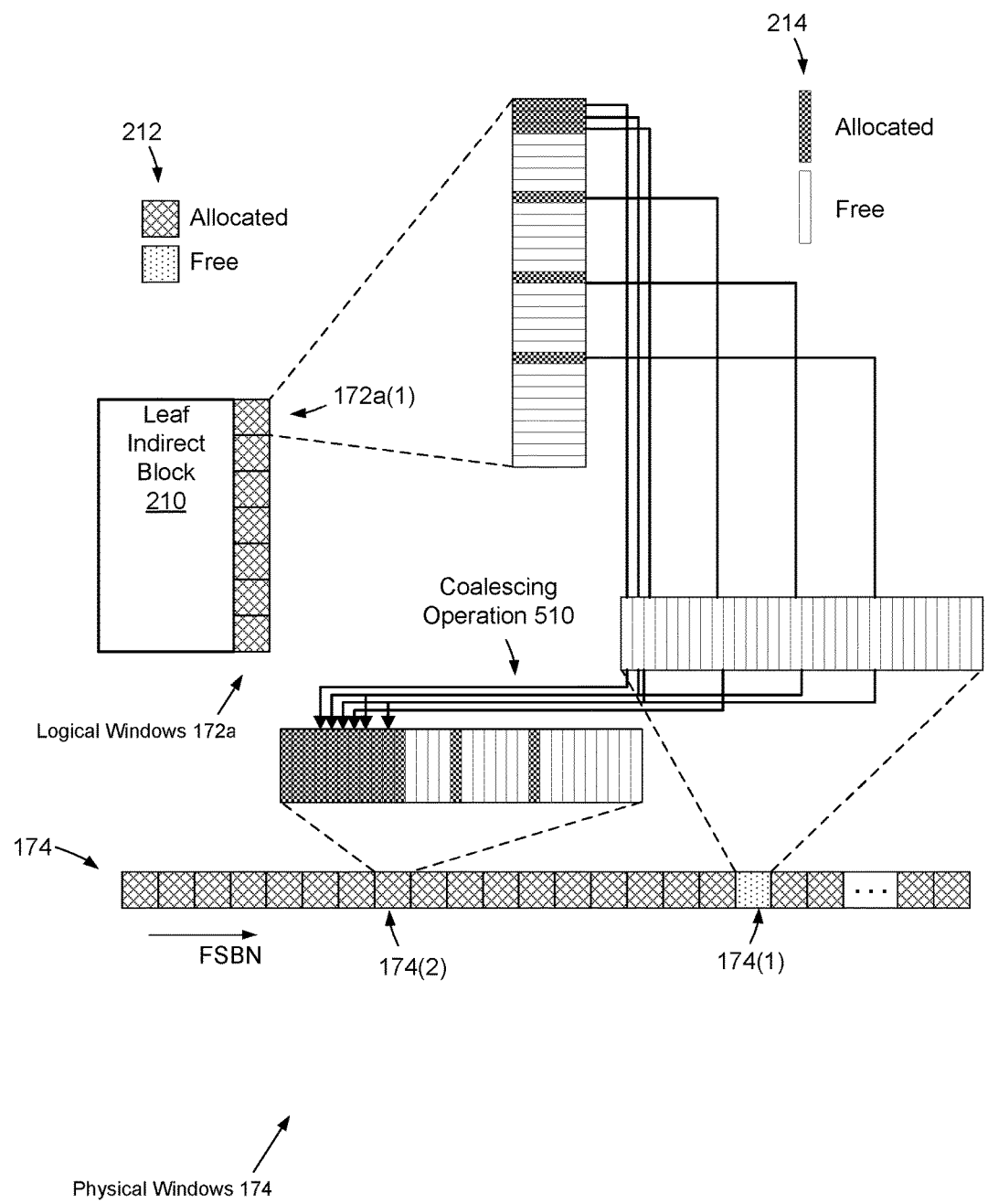
FIG. 5 is a block diagram illustrating example window coalescing operation in the electronic environment of FIG. 1.

FIG. 5 illustrates another situation involving a fully allocated but sparsely populated physical address space. Specifically, FIG. 5 illustrates a coalescing operation 510 that the SP 120 may perform on the file system 150 (FIG. 1) in order to increase storage efficiency. Here, however, windows-based allocation may be preserved for most windows, even if at the expense of others.

The coalescing operation 510 represents a set of instructions that cause the SP 120 to coalesce reserved physical windows 174a. For example, the SP 120 may initiate the coalescing operation when a set of the physical windows 174a has less than a threshold number of occupied blocks over a specified minimum period of time.

The SP 120 performs coalescing operation 510 by moving occupied blocks in one or more of the set of the windows 174 to one or more other sparsely populated windows 174. As shown in FIG. 5, the SP moves data from allocated blocks in window 174(1) to free blocks in window 174(2). The SP 120 then writes the new physical addresses of the relocated blocks in the block pointers in logical window 172a(1), overwriting the old mapping. Finally, once the blocks in physical window 174(1) have been freed, the SP may free physical window 174(1), making it available once again for receiving contiguous data.

Figure 6:
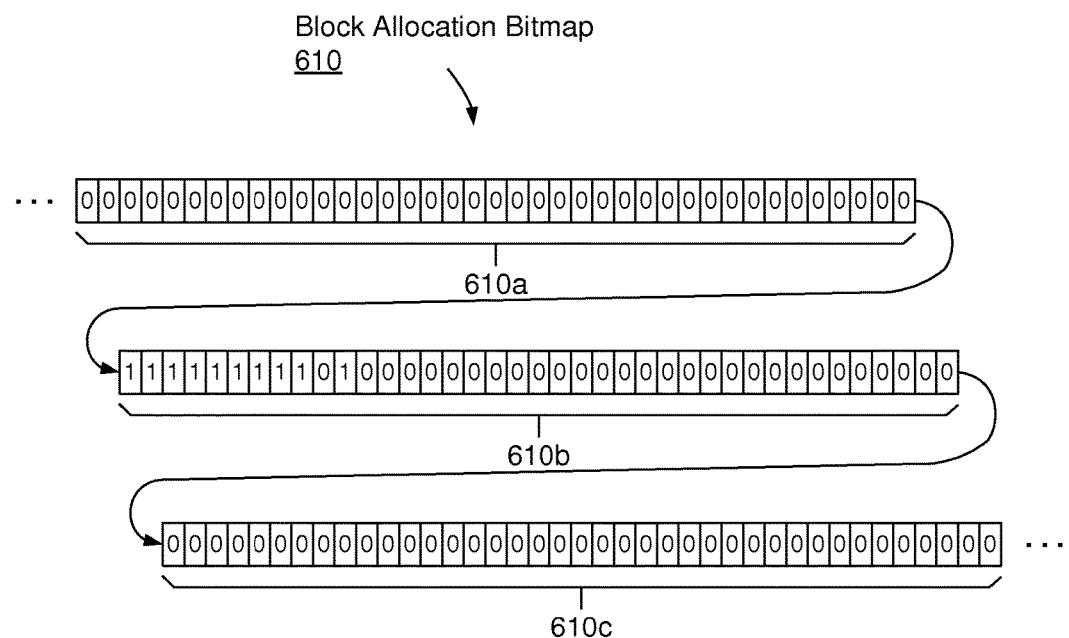
FIG. 6 is a block diagram illustrating an allocation bitmap in the electronic environment of FIG. 1.

FIG. 6 shows example metadata that the file system 150 may employ in tracking the allocation status of blocks in the windows 174 and thus to assist in tracking the allocation status of windows 174. Here, a block allocation bitmap 610 includes consecutive bits that indicate the allocation status of consecutive blocks in the physical address space 320. Each bit of the block allocation bitmap 610 corresponds to a respective FSBN in the file system 150. In this example, a "1" in a bit position of the block allocation bitmap 610 indicates that the block at the corresponding FSBN is allocated, whereas a "0" indicates that the block is free.

The block allocation bitmap 610 may be arranged in groups of bit positions, where each group tracks the allocation status of blocks within a respective window. For example, groups 610a, 610b, and 610c track the allocation status of blocks within respective windows 174. From the bitmap 610, the allocation status of entire windows 174 can be determined, e.g., by computing whether all the bits in each group are zero. It is thus seen from the example of FIG. 7 that windows 610a and 610c are free, as indicated by the bits in groups 610a and 610c all equaling zero, but that window corresponding to group 610b is allocated, as indicated by some of the bits in group 610b equaling one.

Figure 7:
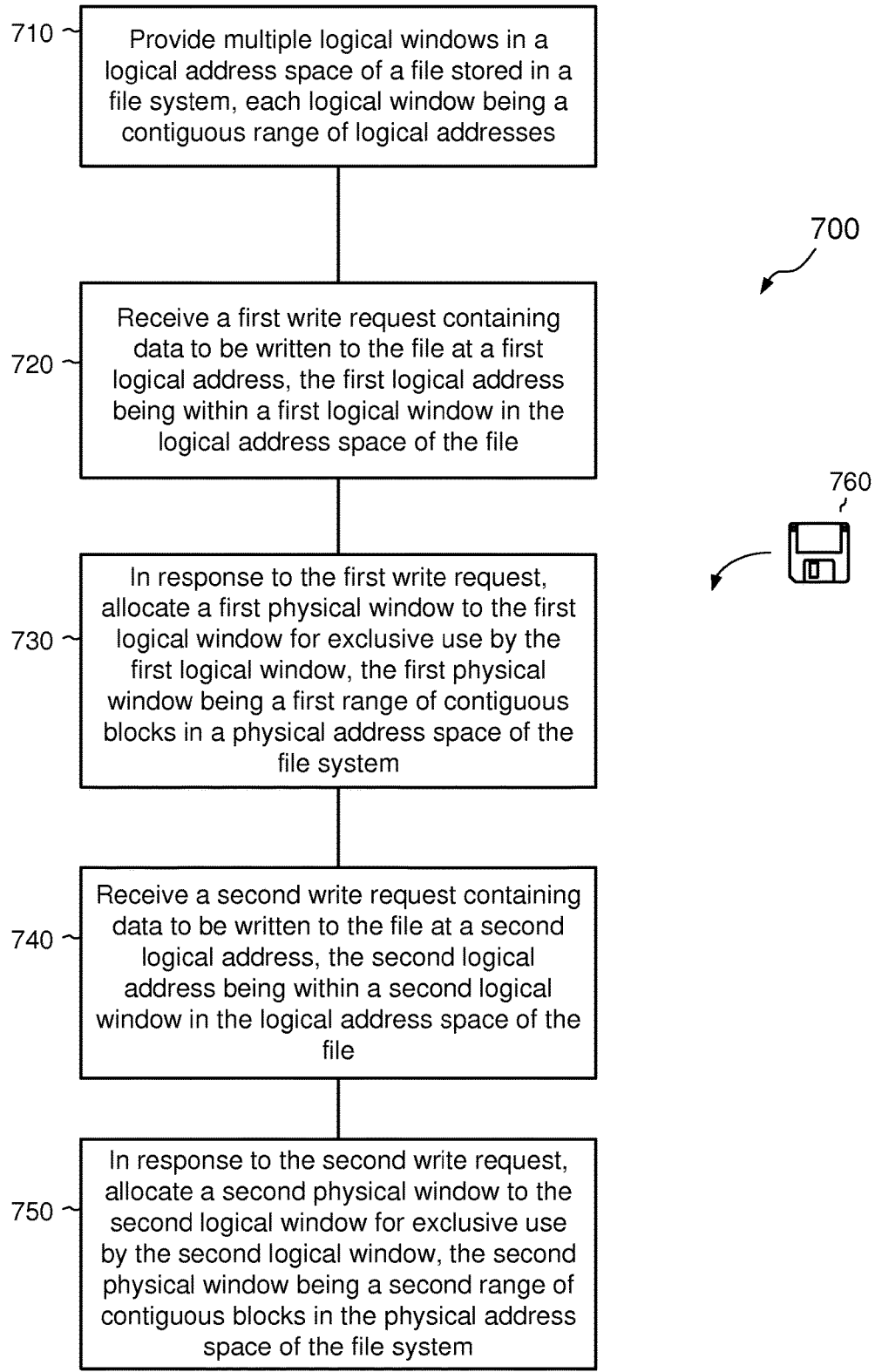
FIG. 7 is a flow chart illustrating a method of carrying out the improved technique in the electronic environment of FIG. 1.

FIG. 7 illustrates a method 700 of managing block allocation in data storage systems and provides a summary of some of the material presented above. The process 700 may be performed by the software constructs described in connection with FIGS. 1-6, which reside in the memory 130 of the storage processor 120 and are run by the set of processing units 124.

At 710, multiple logical windows are provided in a logical address space of a file stored in a file system. Each logical window is a contiguous range of logical addresses in a logical address space of an object-file in a file system. For example, as shown in FIGS. 2-5, a leaf indirect block 210 addresses a portion of the logical address space of its file. The logical address space addressed by the leaf indirect block 210 is divided into multiple logical windows 172.

At 720, a first write request containing data to be written to the file at a first logical address is received. The first logical address is within a first logical window in the logical address space of the file. For example, an IO stream 112 specifies a logical address range at which its data is to be written. This logical address range falls within logical window 260

At 730, a first physical window is allocated to the first logical window for exclusive use by the first logical window in response to the first write request. The first physical window is a first range of contiguous blocks in a physical address space of the file system. For example, the bitmap 610 in FIG. 6 provides a way to locate an unallocated physical window.

At 740, a second write request containing data to be written to the file at a second logical address is received. The second logical address is within a second logical window in the logical address space of the file.

At 750, a second physical window is allocated to the second logical window for exclusive use by the second logical window in response to the second write request. The second physical window being a second range of contiguous blocks in the physical address space of the file system.

Improved techniques of managing block allocation in data storage systems involve providing multiple ranges of contiguous logical addresses (logical windows) in a logical address space of a file and allocating contiguous ranges of physical addresses (physical windows) in a file system to respective logical windows in response to requests to write data to logical addresses within the logical windows. The improved techniques greatly reduce fragmentation, particularly in circumstances wherein multiple streams concurrently write to the same file.

Having described certain embodiments, numerous alternate embodiments or variations can be made. For example, although windows have been shown as being uniformly sized and adjacent, this is not required. Also, although window sizes have been described as matching an integer multiple a RAID group's full stripe, this is merely an example. Window sizes may be based on any suitable criteria or may be selected to balance multiple criteria.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 760 in FIG. 7). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of managing block allocation in data storage systems, the method comprising:
providing multiple logical windows in a logical address space of a file stored in a file system, each logical window being a contiguous range of logical addresses, the logical address space of the file providing a monotonic range of logical offsets into the file from a perspective of a host application;
receiving a first write request specifying data to be written to the file at a first logical address, the first logical address being within a first logical window in the logical address space of the file;
in response to the first write request, allocating a first physical window to the first logical window for exclusive use by the first logical window, the first physical window being a first range of contiguous blocks in a physical address space of the file system;
receiving a second write request specifying data to be written to the file at a second logical address, the second logical address being within a second logical window in the logical address space of the file;
in response to the second write request, allocating a second physical window to the second logical window for exclusive use by the second logical window, the second physical window being a second range of contiguous blocks in the physical address space of the file system,
wherein the file system includes a data subspace divided into windows of uniform size, each window including a predetermined number of blocks, wherein each window has a window number that indicates an ordinal position of the window within the physical address space of the file system, and
wherein the file system includes an indirect block, the indirect block having multiple block pointers, wherein the first logical window is formed from a first contiguous range of block pointers in the indirect block, and wherein the second logical window is formed from a second contiguous range of block pointers in the indirect block.

2. A method as in claim 1, further comprising:
receiving another write request containing (i) first data directed to a set of logical addresses of the file in the first logical window and (ii) second data directed to a set of logical addresses of the file outside of the first logical window; and
in response to receiving the other write request:
storing the first data in blocks within the first physical window; and
storing the second data in blocks outside of the first window.

3. A method as in claim 2, wherein the first logical window and the first physical window each have a beginning address, and wherein storing the first data includes, for each logical address to which the first data are addressed within the first logical window:
computing an offset of that logical address relative to the beginning of the first logical window; and allocating a block in the first physical window at the same offset relative to the beginning of the first physical window.

4. A method as in claim 2,
wherein, when allocating the first physical window, a number of blocks allocated in the first physical window equals a number of logical addresses in the first logical window; and
wherein, when allocating the second physical window, a number of blocks allocated in the second physical window equals a number of logical addresses in the second logical window.

5. A method as in claim 4, wherein the number of logical addresses contained in each of the multiple logical windows is adjustable, and wherein the method further comprises:
receiving a command to set the number of logical addresses contained in each of the multiple logical windows to a specified window size; and
in response to receiving the command, establishing the number of logical addresses contained in each of the multiple logical windows to be the specified window size.

6. A method as in claim 5, wherein content of the file system is stored within a set of RAID (Redundant Array of Independent Disks) groups, the set of RAID groups having a full-stripe size, and wherein the window size is set to be an integer multiple of the full-stripe size.

7. A method as in claim 2, further comprising:
receiving a command to coalesce physical windows;
in response to the receiving the command, (i) identifying a set of sparsely-allocated physical windows having no more than a threshold number of allocated blocks (ii) transferring data stored in the allocated blocks of the set of sparsely-allocated physical windows to other locations in the file system, and (iii) deallocating each of the set of sparsely-allocated physical windows.

8. A method as in claim 2, wherein, in response to (i) a request to allocate a block in a logical window to which no physical window has yet been allocated and (ii) physical windows allocated for exclusive use occupying all available physical address space of the file system for storing file data, the method further comprises:
suspending the use of windows to allocate blocks; and
allocating a free block at a physical address in the file system within a physical window that has was previously reserved for exclusive use.

9. A method as in claim 1, wherein the file system maps each of the multiple logical windows to a respective physical window, and wherein the method further comprises, in response to the first write request:
checking an allocation bitmap to identify a free window of contiguous physical addresses; and
allocating a block within the free window for receiving the data to be written to the file at the first logical address,
wherein allocating the block within the free window effects a reservation of all blocks within the free window for logical addresses within the first logical window.

10. A data storage system configured to manage block allocation, the data storage system comprising:
a storage device; and
a storage processor including memory and controlling circuitry, the controlling circuitry being constructed and arranged to:
provide multiple logical windows in a logical address space of a file stored in a file system, each logical window being a contiguous range of logical addresses, the logical address space of the file providing a monotonic range of logical offsets into the file from a perspective of a host application;
receive a first write request specifying data to be written to the file at a first logical address, the first logical address being within a first logical window in the logical address space of the file;
in response to the first write request, allocate a first physical window to the first logical window for exclusive use by the first logical window, the first physical window being a first range of contiguous blocks in a physical address space of the file system;
receive a second write request specifying data to be written to the file at a second logical address, the second logical address being within a second logical window in the logical address space of the file;
in response to the second write request, allocate a second physical window to the second logical window for exclusive use by the second logical window, the second physical window being a second range of contiguous blocks in the physical address space of the file system,
wherein the file system includes a data subspace divided into windows of uniform size, each window including a predetermined number of blocks,
wherein each window has a window number that indicates an ordinal position of the window within the physical address space of the file system, and
wherein the file system includes an indirect block, the indirect block having multiple block pointers, wherein the first logical window is formed from a first contiguous range of block pointers in the indirect block, and wherein the second logical window is formed from a second contiguous range of block pointers in the indirect block.

11. A data storage system as in claim 10, wherein the controlling circuitry is further constructed and arranged to:
receive another write request containing (i) first data directed to a set of logical addresses of the file in the first logical window and (ii) second data directed to a set of logical addresses of the file outside of the first logical window; and
in response to receiving the other write request:
store the first data contained in the other write request in blocks within the first physical window; and
store the second data contained in the other write request in blocks outside of the first window.

12. A data storage system as in claim 11, wherein the first logical window and the first physical window each have a beginning address, and, wherein the controlling circuitry constructed and arranged to store the first data contained in the other write request is further constructed and arranged to, for each logical address to which the first data are addressed within the first logical window:
compute an offset of that logical address relative to the beginning of the first logical window; and
allocate a block in the first physical window at the same offset relative to the beginning of the first physical window.

13. A data storage system as in claim 12, wherein the controlling circuitry is further constructed and arranged to:
receive a command to coalesce sparsely-inhabited physical windows;
in response to the receiving the command, (i) identify a set of sparsely-allocated physical windows having no more than a threshold number of allocated blocks (ii) transfer data stored in the allocated blocks of the set of sparsely-allocated physical windows to other locations in the file system, and (iii) deallocate each of the set of sparsely-allocated physical windows.

14. A data storage system as in claim 11, wherein, when allocating the first physical window, a number of blocks allocated in the first physical window equals a number of logical addresses in the first logical window; and wherein, when allocating the second physical window, a number of blocks allocated in the second physical window equals a number of logical addresses in the second logical window.

15. A data storage system as in claim 14, wherein the number of logical addresses contained in each of the multiple logical windows is adjustable; and wherein the controlling circuitry is further constructed and arranged to receive a command to set the number of logical addresses contained in each of the multiple logical windows to a specified window size; and in response to receiving the command, establishing the number of logical addresses contained in each of the multiple logical windows to be the specified window size.

16. A data storage system as in claim 15, wherein content of the file system is stored within a set of RAID (Redundant Array of Independent Disks) groups, the set of RAID groups having a full-stripe size, and wherein the window size is set to be an integer multiple of the full-stripe size.

17. A data storage system as in claim 11, wherein, in response to (i) a request to allocate a block in a logical window to which no physical window has yet been allocated and (ii) physical windows allocated for exclusive use occupying all available physical address space of the file system for storing file data, the controlling circuitry is further constructed and arranged to:

suspend the use of windows to allocate blocks; and allocate a free block at a physical address in the file system within a physical window that has was previously reserved for exclusive use.

18. A computer program product comprising a non-transitory, computer-readable storage medium which stores executable code, which when executed by a data storage system, causes the data storage system to perform a method of managing block allocation in data storage systems, the method comprising:

providing multiple logical windows in a logical address space of a file stored in a file system, each logical window being a contiguous range of logical addresses, the logical address space of the file providing a range of logical offsets into the file from a perspective of a host application;

receiving a first write request containing data to be written to the file at a first logical address, the first logical address being within a first logical window in the logical address space of the file;

in response to the first write request, allocating a first physical window to the first logical window for exclusive use by the first logical window, the first physical window being a first range of contiguous blocks in a physical address space of the file system;

receiving a second write request containing data to be written to the file at a second logical address, the second logical address being within a second logical window in the logical address space of the file;

in response to the second write request, allocating a second physical window to the second logical window for exclusive use by the second logical window, the second physical window being a second range of contiguous blocks in the physical address space of the file system, wherein the file system includes a data subspace divided into windows of uniform size, each window including a predetermined number of blocks, wherein each window has a window number that indicates an ordinal position of the window within the physical address space of the file system, and wherein the file system includes an indirect block, the indirect block having multiple block pointers, wherein the first logical window is formed from a first contiguous range of block pointers in the indirect block, and wherein the second logical window is formed from a second contiguous range of block pointers in the indirect block.

19. A computer program product as in claim 18, wherein the method further comprises:

receiving another write request containing (i) first data directed to a set of logical addresses of the file in the first logical window and (ii) second data directed to a set of logical addresses of the file outside of the first logical window; and in response to receiving the other write request:

storing the first data in blocks within the first physical window; and storing the second data in blocks outside of the first window.

20. A computer program product as in claim 19, wherein the first logical window and the first physical window each have a beginning address, and wherein storing the first data includes, for each logical address to which the first data are addressed within the first logical window:

computing an offset of that logical address relative to the beginning of the first logical window; and allocating a block in the first physical window at the same offset relative to the beginning of the first physical window.

* * * * *